United States Patent
Raghupathy

(10) Patent No.: US 9,899,912 B2
(45) Date of Patent: Feb. 20, 2018

(54) VOLTAGE REGULATOR WITH DYNAMIC CHARGE PUMP CONTROL

(71) Applicant: Vidatronic Inc., College Station, TX (US)

(72) Inventor: Anand Veeravalli Raghupathy, Plano, TX (US)

(73) Assignee: Vidatronic, Inc., College Station, TX (US)

( * ) Notice: Subject to any disclaimer, the term of this patent is extended or adjusted under 35 U.S.C. 154(b) by 0 days.

(21) Appl. No.: 15/250,777

(22) Filed: Aug. 29, 2016

(65) Prior Publication Data

US 2017/0063223 A1 Mar. 2, 2017

Related U.S. Application Data

(60) Provisional application No. 62/211,356, filed on Aug. 28, 2015.

(51) Int. Cl.
*H02M 3/07* (2006.01)
*G05F 1/56* (2006.01)
*H02M 1/00* (2006.01)

(52) U.S. Cl.
CPC .............. *H02M 3/07* (2013.01); *G05F 1/56* (2013.01); *H02M 2001/0045* (2013.01)

(58) Field of Classification Search
CPC ... H02M 3/07; H02M 2001/0045; G05F 1/56; G05F 1/10; G05F 1/575; G05F 1/00
USPC .............. 327/2–12, 105–123, 141, 144–163, 327/534–537; 331/15–17; 375/373–376; 363/59, 60
See application file for complete search history.

(56) References Cited

U.S. PATENT DOCUMENTS

| | | | | |
|---|---|---|---|---|
| 5,939,867 A * | 8/1999 | Capici | ..................... | G05F 1/565 323/277 |
| 6,046,577 A * | 4/2000 | Rincon-Mora | ......... | G05F 1/575 323/279 |
| 6,188,212 B1 * | 2/2001 | Larson | ..................... | G05F 1/56 323/274 |
| 6,246,221 B1 * | 6/2001 | Xi | ........................... | G05F 1/575 323/280 |
| 7,746,047 B2 * | 6/2010 | Yin | ........................ | G05F 1/575 323/273 |
| 9,223,329 B2 * | 12/2015 | Pulvirenti | ................ | G05F 1/56 |
| 9,501,075 B2 * | 11/2016 | Bisson | .................... | G05F 1/575 |

(Continued)

*Primary Examiner* — Brandon S Cole

(74) *Attorney, Agent, or Firm* — Liang Legal Group, PLLC

(57) ABSTRACT

A charge pump driven Linear Voltage Regulator (LVR) system with a cascoded n-type output pass device includes an error amplifier; a voltage feedback network; a dynamically controlled charge pump block that is ON only when required and OFF otherwise; a gate drive system configured to ensure that the charge pump drives only gate of a cascode transistor and no DC or static current load such that a voltage is preserved for a duration; and a filter at the charge pump output to reduce an impact of the switching noise of the charge pump on the regulator output, wherein the filter is outside a main servo loop of the regulator, wherein an n-type pass element and/or cascode element in the cascoded n-type output pass device comprises at least one of a Metal Oxide Semiconductor (MOS) Field Effect Transistor (FET), a bipolar junction transistor, an LDMOS, or a FinFET device.

13 Claims, 9 Drawing Sheets

(56) References Cited

U.S. PATENT DOCUMENTS

| | | | | |
|---|---|---|---|---|
| 2003/0214275 A1* | 11/2003 | Biagi | ............ | G05F 1/575 323/280 |
| 2006/0012354 A1* | 1/2006 | Nunokawa | ............ | G05F 1/575 323/273 |
| 2010/0259235 A1* | 10/2010 | Ozalevli | ............ | G05F 1/56 323/274 |
| 2013/0285631 A1* | 10/2013 | Bisson | ............ | G05F 1/575 323/280 |
| 2015/0185747 A1* | 7/2015 | Liu | ............ | G05F 1/565 323/268 |

* cited by examiner

VOLTAGE REGULATOR WITH DYNAMIC CHARGE PUMP CONTROL

CROSS REFERENCE TO RELATED APPLICATIONS

This claims the benefits of Provisional Application No. 62/211,356, filed on Aug. 28, 2015, the disclosure of which is incorporated by reference in its entirety.

BACKGROUND

FIG. 1 shows a schematic block diagram of a generic Linear Voltage Regulator (100), with its main components being the Error Amplifier (101), the Gate Driver (102), the feedback network consisting $R_2$ (103) and $R_1$ (104), the load network consisting of $R_L$ (105) and $C_L$ (106) and last, but certainly not the least, the pass device $M_{PASS}$ (107). The closed loop operation of the voltage regulator fixes the output voltage $V_{OUT}$ (108) to $V_{OUT}=V_{REF}*(1+R_2/R_1)$, by forcing the feedback node $V_{FB}$ (111) to be equal to the reference voltage $V_{REF}$ (110). It is interesting to note that the output voltage is independent of the Input Supply $V_{IN}$ (109). Throughout this description, the terms, "power/input supply," "supply," "$V_{IN}$," and "$V_{IN}$ terminal or node" may be used interchangeably to refer to the power source input to a voltage regulator, which may or may not be a high voltage such as 15V, or even higher.

The reference voltage input to the regulator is usually generated from a band gap circuit. The error amplifier (101) may be a single stage or a multi-stage amplifier. The resistor $R_2$ may be a short circuit, and/or the resistor $R_1$ may be an open circuit in some architectures. The pass device can be an n-type or a p-type Bipolar Transistor, a CMOS transistor, an LDMOS or even a FINFET, as per the manufacturing process and specifications. For CMOS implementations, as far as the pass device is concerned, it is preferred to use an NMOS device instead of a PMOS device for two main reasons, explained in the next paragraph.

First, the size of the pass device for a given drop-out voltage (i.e. voltage difference between $V_{IN}$ (110) and $V_{OUT}$ (108)) and current rating is at least a factor of two-three times smaller than the corresponding PMOS transistor, due to inherently better mobility and so forth. Second, the small signal output impedance of an NMOS device ($1/g_m$) is much lower than a PMOS device ($g_{ds}$). This essentially means improved AC drive capability, especially in presence of larger capacitive loads, which translates to better loop stability for wide ranges of output load capacitors. However, the NMOS transistor requires enough voltage overdrive at its gate to be able to operate as required, and usually, the highest the gate can rise, is dictated by the available input supply (the minimum level that has to be supported) and the amount of voltage headroom needed by the gate driver circuit. Essentially, this translates to a high drop-out voltage for the regulator. Drop-out for a regulator quantifies how close the output can be to the minimum Input Supply. The smaller the drop-out, the more efficient the regulator. It is hence obvious that achieving low drop-out and having an NMOS pass device are conflicting requirements, having to be traded-off against each other. However, it is worthwhile to point out that this is not the case all the time, as there are several applications where the input supply might be much larger, whereas the output has to be kept at a low enough level to support appropriate loads.

PRIOR ART

Current solutions, such as U.S. 2011/0156670 A1 (the '670 application) and U.S. 2011/0089916 A1 (the '916 application), use a charge pump to generate a high enough internal voltage rail in some way to drive the necessary circuits. However, all these schemes suffer from the drawback of higher quiescent current and larger die area for the charge pump blocks, as the charge pump block has to drive circuits that present quiescent load currents and also run all the time the regulator is in operation. Specifically regarding the '670 and '916 applications, the charge pump switching noise/ripple occurs right at the gate of the pass transistor, thereby causing some amount of coupling to the regulator output. For the rest of this description, the terms "charge pump" and "charge pump block" may be used interchangeably to mean the set of circuits that comprise the charge pump function.

FIG. 2 shows the schematic "conceptual" block diagram of a Linear Voltage Regulator (200) which uses an NMOS transistor $MN_{OUT\_HIGH\_VOLTAGE}$ (207) as the power transistor (pass transistor). Usually, this device has to be rated to the maximum input voltage level, which is usually (but not always) quite high, such as 15V or higher, and is hence, a thick gate device or a drain-extended high voltage device or an LDMOS. Due to this reason, the pass transistor tends to be excessively large in size, as it has to withstand high voltage, in addition to having to sustain the full load current. The Error Amplifier (201) and the Gate Driver (202) are powered by an internal rail $V_{INT}$ (216) that is generated by a charge pump block (213) that includes associated circuits like an oscillator etc. The pump voltage is set to an appropriate level, so as to achieve the required low drop-out at the output.

The charge pump input voltage (215) choices as reported in prior literature are usually either a gained up version (216) of the reference voltage itself or a level limited version (212) of the input supply, so that the charge pump output voltage is bounded correctly.

Use of such a charge pump, however is usually not preferred, as it comes with multiple limitations. Not only does it take up significant extra die area due to large sized capacitors and big high voltage switch sizes required to sustain the load currents of (201) and (202) along with the leakage related charge losses of the parasitic transistors that are formed to the wells and substrates, but, it also requires significant amount of quiescent current to run itself, not to mention the additional power due to the associated oscillator and other support circuitry required to run the charge pump. Typical charge pump circuits consume several hundreds of μA to mA, thereby significantly reducing the competitive aspect of the product and in several cases, rendering the resulting product un-usable.

While these prior art voltage regulators ar satisfactory for many application, there still exists a need for better voltage regulators.

SUMMARY

In general, in one aspect, the invention relates to a novel architecture and method to significantly reduce the quiescent current of charge pump circuit blocks that drive cascode devices of voltage regulator circuits with NMOS pass devices by dynamically switching these charge pump blocks ON and OFF based on need, thus reducing its time-averaged current consumption. In accordance with some embodiments of the invention, an architecture and method to sense the charge pump voltage, compare it against a reference level that generates control signals to determine whether the charge pump circuits need to be ON or OFF during regulator operation.

In accordance with embodiments of the invention, a charge pump driven Linear Voltage Regulator (LVR) system with a cascoded n-type output pass device includes an error amplifier; a voltage feedback network; a dynamically controlled charge pump block that is ON only when required and OFF otherwise; a gate drive system configured to ensure that the charge pump drives only gate of a cascode transistor and no DC or static current load such that a voltage is preserved for a duration; and a filter at the charge pump output to reduce an impact of the switching noise of the charge pump on the regulator output, wherein the filter is outside a main servo loop of the regulator, wherein an n-type pass element and/or cascode element in the cascoded n-type output pass device comprises at least one of a Metal Oxide Semiconductor (MOS) Field Effect Transistor (FET), a bipolar junction transistor, an LDMOS, or a FinFET device.

In accordance with some embodiments of the invention, a Linear Voltage Regulator system with low drop-out voltage using an n-type pass device, without a cascode, comprising: an error amplifier; a voltage feedback network; a multiple input floating gate MOS device as the pass device; a bias block to generate a control gate bias voltage of the multiple input floating gate MOS device such that an effective threshold voltage is lowered to a selected level to realize low drop-out; and an adaptive block to make the control gate bias voltage a function of an input supply and a load current.

In accordance with embodiments of the invention, a method for reducing power consumption of a charge pump driven Linear Voltage Regulator (LVR) with a cascoded n-type output pass device may comprises: (a) sensing a charge pump output level; (b) comparing the charge pump output level against a reference level; (c) dynamically controlling the a charge pump block to be ON only when required and OFF otherwise; (d) ensuring that the charge pump drives only gate of the cascode transistor and no DC/static current load, so that a voltage is preserved for a duration; and (e) filtering a charge pump output to reduce an impact of a switching noise of the charge pump on a regulator output, without causing stability impact, by performing the filtering outside a main servo loop of the LVR; wherein an n-type pass element and/or cascode element in the cascoded n-type output pass device comprises at least one selected from the group consisting of a Metal Oxide Semiconductor (MOS) Field Effect Transistor (FET), a bipolar junction transistor, a laterally diffused metal oxide semiconductor (LDMOS), and a FinFET device.

In accordance with some embodiments of the invention, a method for achieving low drop-out (LDO) voltage regulation for a non-cascoded Linear Voltage Regulator (LVR) using an n-type pass device may comprise: (a) using a multiple input floating gate MOS device as the pass device; and (b) biasing the control gate bias voltage such that a threshold voltage is lowered to a selected level to realize LDO, wherein the biasing is by controlling an input supply and/or a load current.

In general, in one aspect, the invention relates to a novel architecture and method to significantly reduce the quiescent current of charge pump circuit blocks that drive voltage regulator circuits with NMOS pass devices by dynamically switching these charge pump blocks ON and OFF based on need, thus reducing its time-averaged current consumption. In accordance with some embodiments of the invention, an architecture and method to ensure that the charge pump drives only gates of transistors and no static current loads, so that the voltage may be preserved for long periods of time, before slowly draining due to leakage loads.

In general, in one aspect, the invention relates to a novel architecture and method to minimize the high frequency switching noise of the charge pump mentioned above. In accordance with some embodiments of the invention, an architecture and method to filter this noise using a simple passive filter (like an RC filter for example), before feeding it on to drive the required circuits. This is rendered possible due to the unique aspect of the load on the charge pump, as highlightedherein.

In general, in one aspect, the invention relates to a novel architecture and method to achieve very low drop-out voltage. In accordance with some embodiments of the invention, an architecture and method to use a multiple input floating gate NMOS pass device, sized and biased appropriately as explained in the disclosure. This aspect may be used in conjunction with the charge pump driven cascode structure described above or by itself, depending on whether the input supply domain is to be de-coupled from the regulator circuitry through the use of a cascoded transistor (which may or may not be a floating gate device) or not, based on performance requirements.

In general, in one aspect, the invention relates to a novel architecture and method to achieve very low drop-out voltage, as required, by using a multiple input floating gate NMOS pass device described previously. In accordance with some embodiments of the invention, an architecture and method where the floating gate transistor may or may not be a high voltage rated device, depending on maximum input supply rating, among other factors.

In general, in one aspect, the invention relates to a novel architecture and method to minimize extra circuitry, such as input buffers (lower area and power) required to generate the input for the charge pump. In accordance with some embodiments of the invention, an architecture and method to feed back the output voltage of the regulator to be used as the input to the charge pump.

In general, in one aspect, the invention relates to a novel architecture and method to minimize glitches on the regulator output during initial start-up. In accordance with some embodiments of the invention, an architecture and method to start up the regulator using a clean start-up circuit that first charges the regulator output from 0V up to the point where it reaches the final regulation set point voltage and then hands over control to the charge pump which then sustains the regulator output through the feedback loop action at the exact same set point. This process minimizes the glitches on the regulator output, as the transition from start-up to closed loop regulation happens at the same set point.

BRIEF DESCRIPTION OF DRAWINGS

The appended drawings illustrate several embodiments of the invention and are not to be considered limiting of its scope, for the invention may admit to other equally effective embodiments.

DETAILED DESCRIPTION

Figure 1:
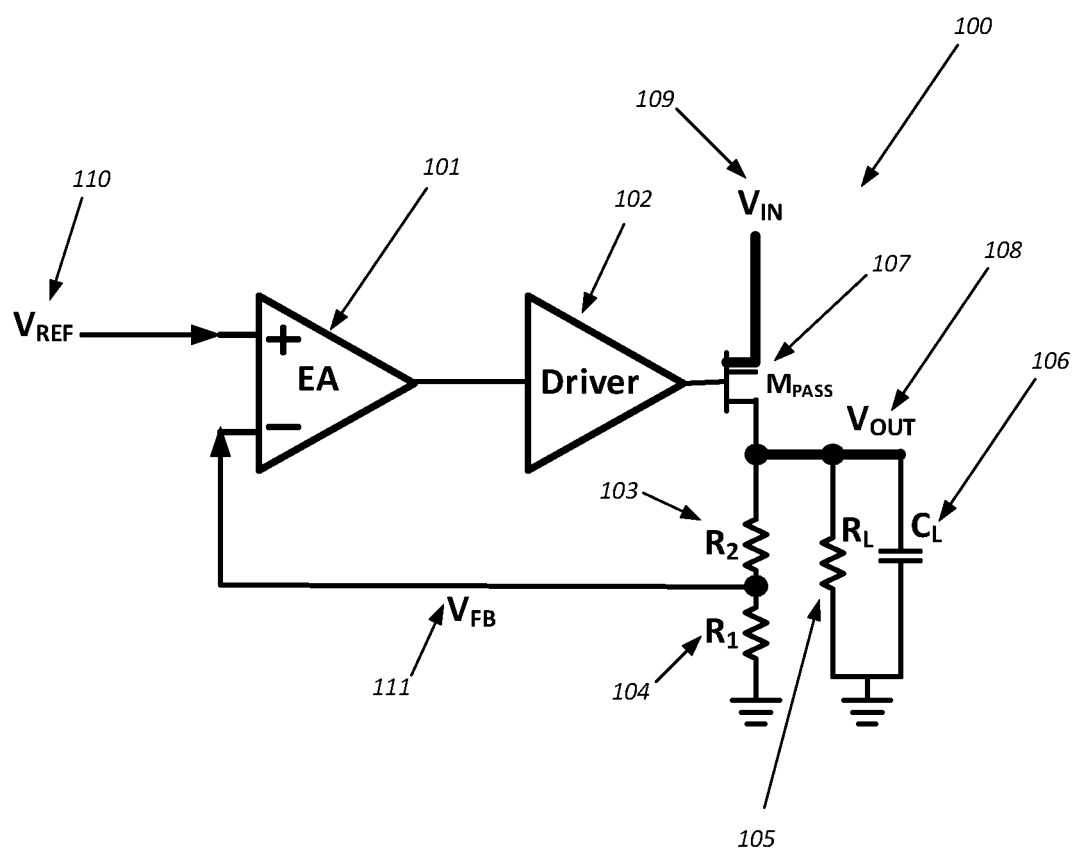
FIG. 1 shows a generic Linear Voltage Regulator (LVR) Loop.
Figure 2:
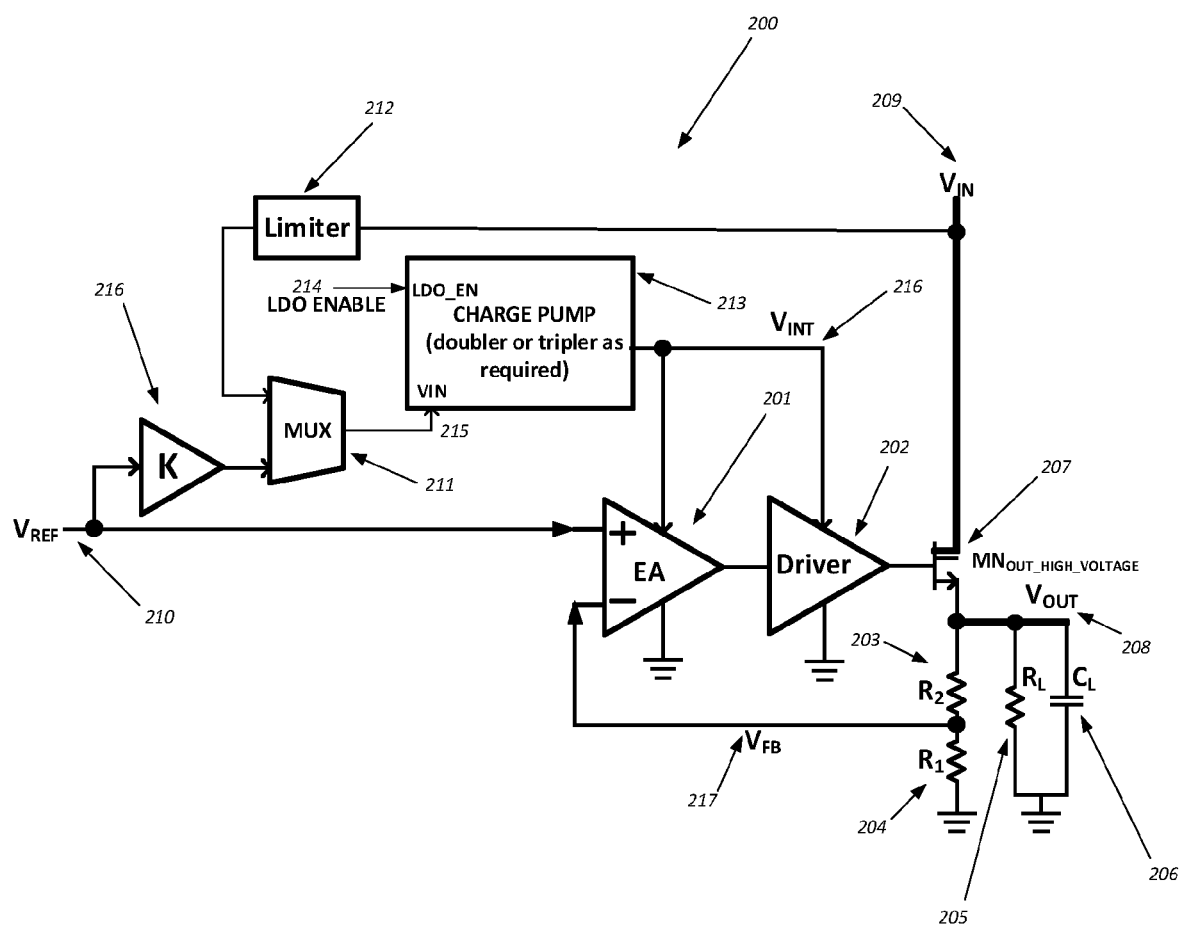
FIG. 2 shows a typical current state of the art low drop-out LVR that uses a charge pump to drive the internal circuits.

Aspects of the present disclosure are shown in the above-identified drawings and are described below. In the description, like or identical reference numerals are used to identify common or similar elements. The drawings are not necessarily to scale and certain features may be shown exaggerated in scale or in schematic in the interest of clarity and conciseness.

Figure 10:
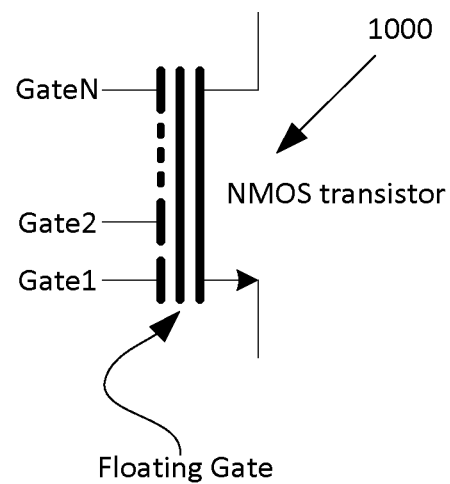
FIG. 10 shows multiple input floating gate NMOS transistors as a pass device, in accordance with one embodiment of the invention.

In accordance with embodiments of this patent, innovative solutions are provided which address the quiescent current problem by employing modified architectures that dynamically control the charge pumps and their associated circuits to keep them ON only when it is really required, while turning it OFF for significant chunks of time for which it is not needed In accordance with embodiments of the invention, if it is desired to achieve low drop-out, in addition to low quiescent current, further innovations are proposed that use multiple input floating gate NMOS transistors as a pass device (1000) (FIG. 10), biased appropriately, as will be explained later. The other key innovative aspects of embodiments of the invention are that the modified architectures are such that the charge pumps no longer have to provide any static currents, but they just have to drive gates of transistors, which enable them to be simple and small in sizes.

Further, in accordance with embodiments of the invention, there are several variations of voltage regulator topologies that can be derived by combining these techniques which further improve performance, based on how the control bias gate of the floating gate transistor is generated. The details of these embodiments are illustrated in the following sections.

Figure 3:
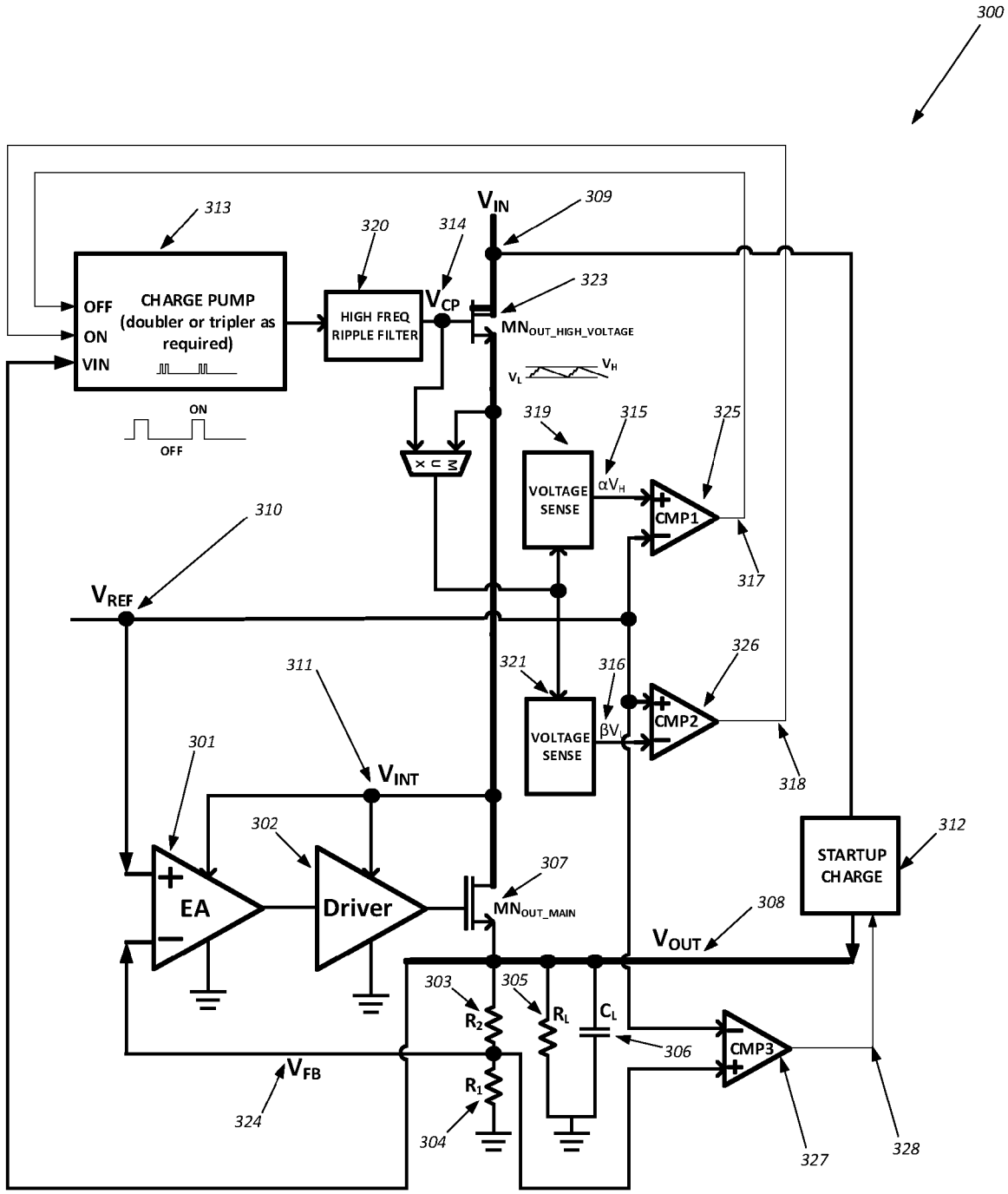
FIG. 3 shows an LVR architecture with several enhancements to improve performance metrics, while reducing the power consumption, in accordance with one embodiment of the invention.

In accordance with one embodiment of the invention, FIG. 3 describes a topology of a Linear Voltage Regulator (300), which uses a dynamic control of the charge pump block (313). There are several key innovations in this architecture and they are illustrated below in detail.

Figure 7:
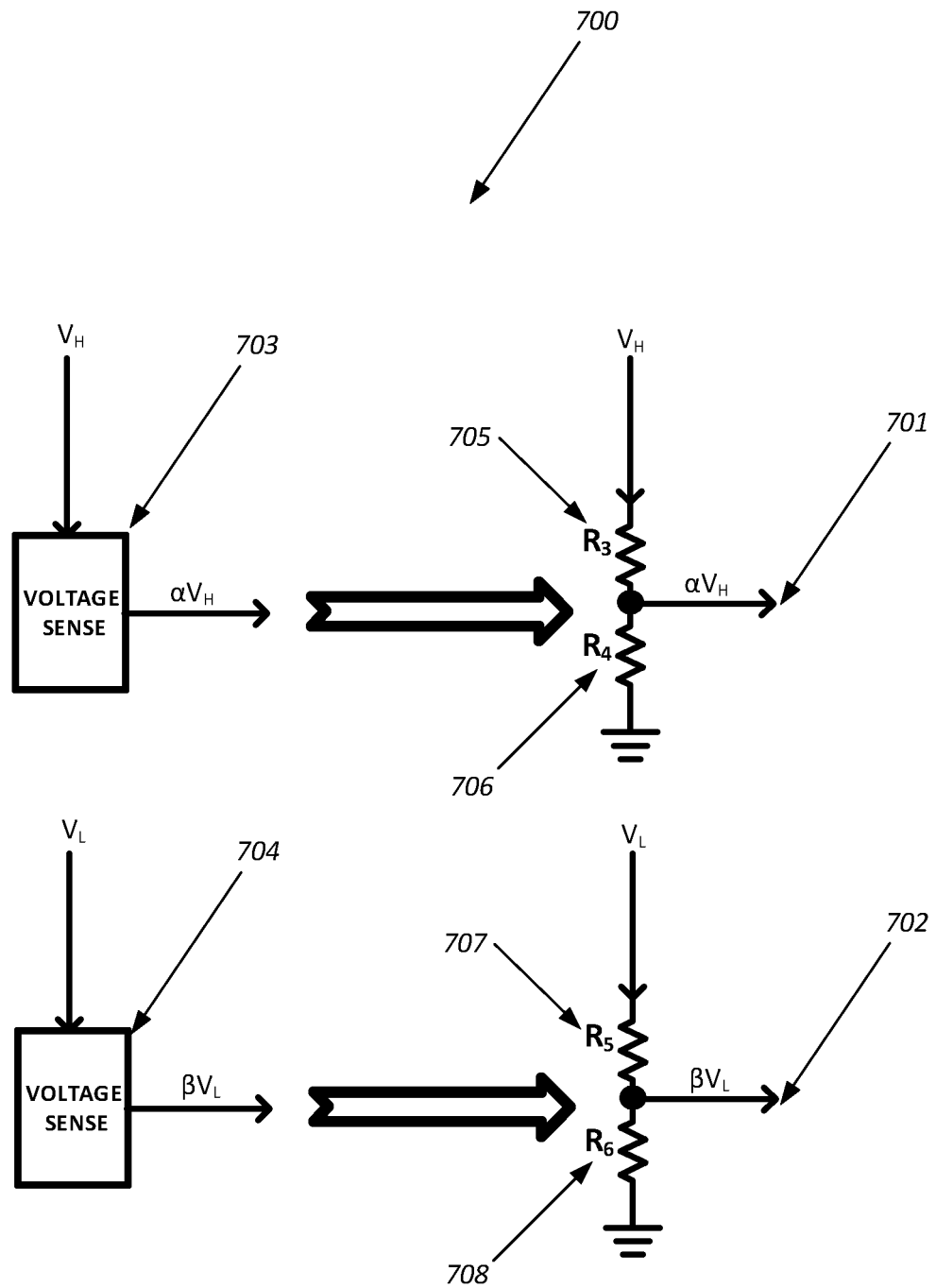
FIG. 7 shows an implementation for the voltage sensing network of FIG. 3, in accordance with one embodiment of the invention.

First, the charge pump does NOT run all the time. It runs only when required, thereby taking less average current. This dynamic control is achieved by the comparators CMP1 (325) and CMP2 (326), which generate the OFF (317) and ON (318) charge pump signals, respectively. These signals are generated by comparing with a known reference $V_{REF}$ (310), the scaled down version of either the charge pump output $V_{CP}$ (314) or the node $V_{INT}$ (311). This is achieved by the voltage sensing networks (319) and (321). One such possible implementation for these networks uses resistor dividers (705,706,707 and 708), as shown in FIG. 7. By using this scheme of two comparators and $V_{INT}$ for the sensing, the internal rail $V_{INT}$ gets precisely bounded between the levels $V_H = V_{REF}*(1+R_3/R_4)$ and $V_L = V_{REF}*(1+R_5/R_6)$. The ratios $(R_3/R_4)$ and $(R_5/R_6)$ can be chosen so that the $V_{INT}$ is above $V_{OUT}$ (308) and below the minimum $V_{IN}$ (309), by the required amounts as long as the circuits have enough voltage head room to operate correctly.

Figure 4:
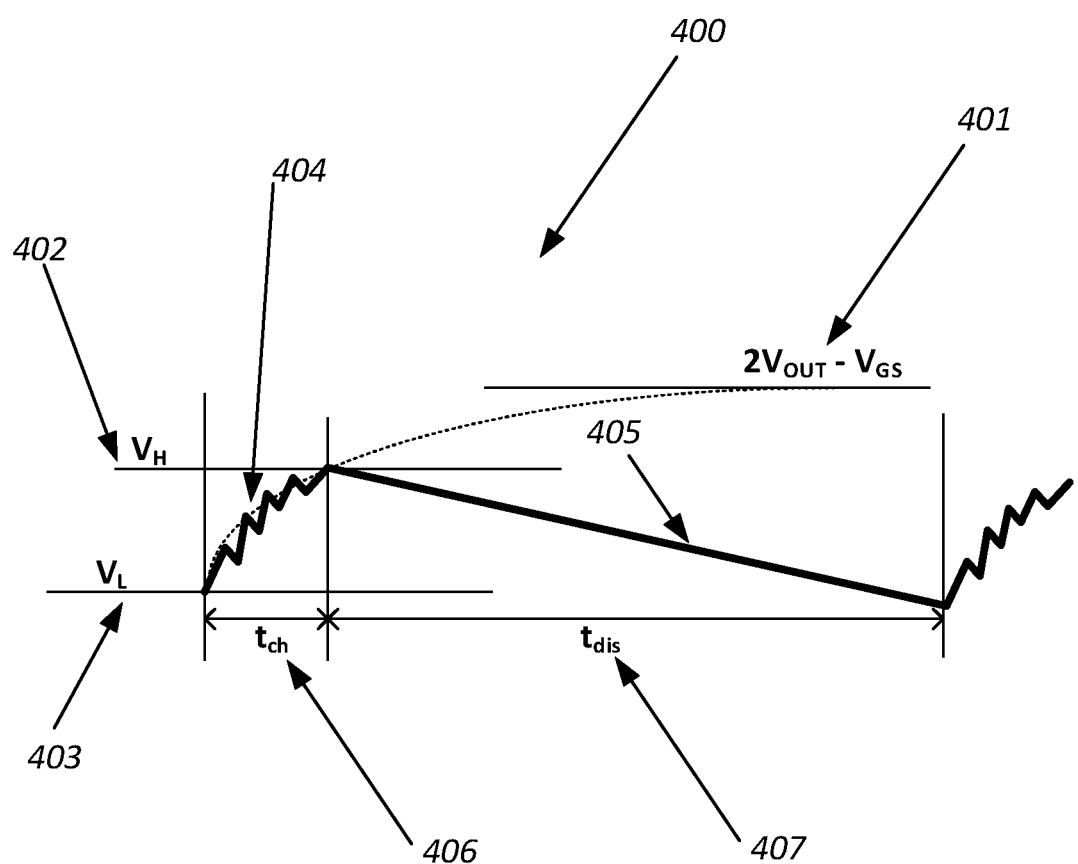
FIG. 4 shows a typical waveform at the internal node $V_{INT}$ for the architecture of FIG. 3, in accordance with one embodiment of the invention.

In accordance with embodiments of the invention, FIG. 4 shows a waveform (400) at the $V_{INT}$ node (311). If there were no level bounding of the voltage, it would eventually reach a steady state voltage of $(2 \times V_{OUT} - V_{GS}$ (401)), assuming we have a voltage doubler for the charge pump. The $V_{GS}$ mentioned here is the voltage drop of the cascode device (323) mentioned earlier. Since we have the level control however, the voltage will always be bounded between $V_H$ (402) and $V_L$ (403). While the charging is approximately exponential (404), the discharge is mostly linear (405) and is only due to the parasitic leakage load on the $V_{INT}$ node (which is usually in the sub-nA range). Linear analysis shows that the charging time (406) and discharging time (407) are given as $t_{ch}=$ $$\frac{C_{LOAD}}{F_S * C_{bucket}} \ln\left(\frac{2V_{out} - V_L - V_{GS}}{2V_{out} - V_H - V_{GS}}\right) \text{ and}$$

$$t_{dis} = \frac{(C_{LOAD} + C_{bucket})}{I_{leak}}(V_H - V_L),$$

respectively. Here, $C_{LOAD}$ is the capacitance load at the charge pump output $V_{CP}$ (314), $F_S$ is the charge pump switching frequency while running, $C_{bucket}$ is the switching capacitor inside the charge pump circuitry and $I_{leak}$ is the leakage load at (314). If the charge pump consumes a quiescent current of $I_Q$ while ON, the effective average charge pump current now decreases to $$I_{AVG} = \left(\frac{t_{ch}}{t_{ch} + t_{dis}}\right) I_Q.$$

To put the above in perspective, we now calculate this current for a typical design case. Let $I_Q$=1 mA, $C_{LOAD}$=100 pF, $C_{bucket}$=10 pF, $V_{OUT}$=5V, $V_H$=5.2V, $V_L$=5.1V, $V_{GS}$=2V, $F_S$=1 MHz and an exaggerated $I_{leak}$=10 nA. Using the above equations, the effective current is only 0.32 uA, which is more than a 1000× reduction in the charge pump quiescent current. And this is with a pessimistic 100 mV delta between $V_H$ and $V_L$. If we can afford to increase this some more, then the current reduction becomes even more dramatic.

Second, the charge pump drives only the gate of the device $MN_{OUT\_HIGH\_VOLTAGE}$ (323), hence it does not have to be big in size. Small sized switches can be used, as long as the frequency of operation is limited to a few MHz and also, the charge pump capacitors do not have to be large, as there is no DC load current on them. Thus, the gate charge doesn't drain away due to intentional load current. The only loss is due to charge sharing with the parasitic gate capacitance of (323) and also the gate leakage current of (323), which is sub-nA in magnitude. This charge can be re-plenished in just a few cycles of charge pump operation.

Third, the architecture inherently has an internal node $V_{INT}$ (311), which can be used as the internal rail to power the EA (301) and Gate Driver (302). There is no need for any other circuitry to generate this rail, as is done in other prior art.

Fourth, the architecture allows the $V_{INT}$ level to be set independent of the input supply, as explained previously. There are two-fold advantages to this, one being better supply rejection and the second being the de-coupling of the key regulator circuits from the main high voltage input supply domain $V_{IN}$. This allows the use of low voltage rated devices for all the circuits, such as (301) and (302), and even for the pass transistor (307), thereby significantly improving the transient performance of the regulator core.

It is relevant at this point to mention that there are some prior art, which have also tried to achieve such decoupling from the main supply, by use of cascading technique. However, it is important to differentiate our approach from the prior art approach, in at least three key aspects, which enable better performance metrics, especially much lower power consumption among other things like die area. First, approaches according to embodiments of the invention do not run the charge pump all the time. Second, solutions according to embodiments of the invention do not load the charge pump with a DC current load. Third, embodiments of the invention do not need additional sub-regulator circuits to generate the input to the charge pump; instead, the input to the charge pump is fed back from the regulator output itself.

Figure 6:
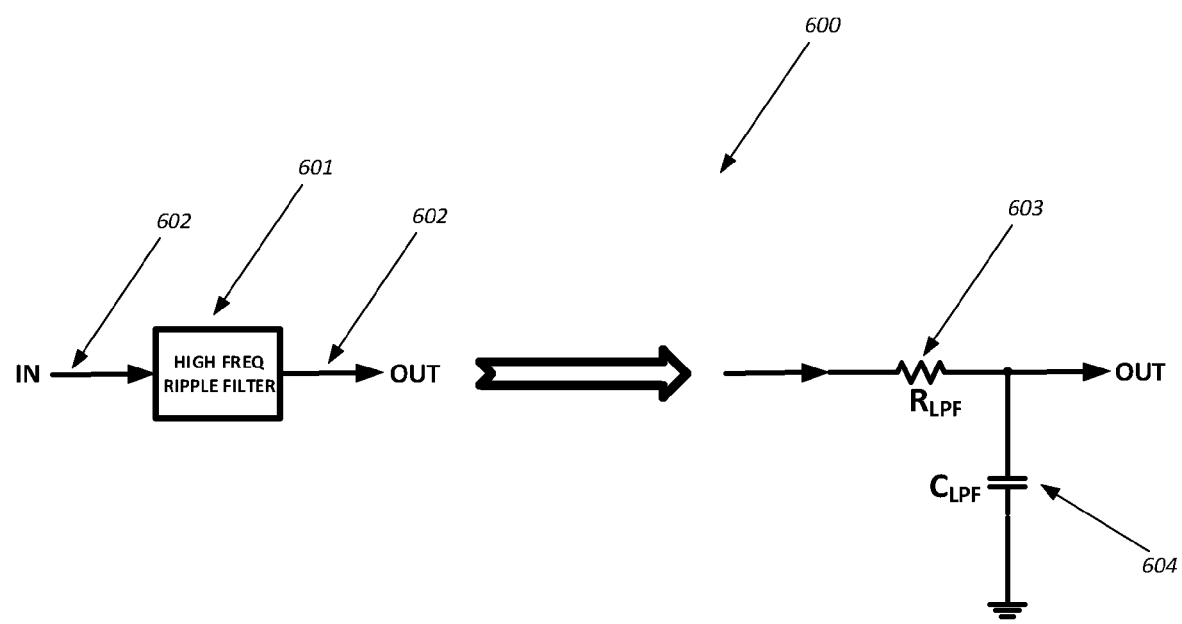
FIG. 6 shows an implementation of the filter on the charge pump output, in accordance with one embodiment of the invention.

Fifth, in order to mitigate the effect of the high frequency switching noise of the charge pump on the regulator output, it is proposed to place a filter on the output, before being used further. FIG. 6 shows one possible implementation of this filter (600) that is formed by $R_{LPF}$ (603) and $C_{LPF}$ (604). The pole is set such that it is low enough to filter the high frequency noise injected at the clock frequency rate. It is best to choose as large a $C_{LPF}$ as possible to get the best filtering and the most reduction in quiescent current, as it takes more time for the voltage to discharge due to parasitic leakage loads, as noted above. It is worthwhile to mention here that there is no other restriction on the filter resistor, such as an IR drop requirement, due to the unique feature of the innovation of zero DC load on the pump output. Thus, there is good design flexibility in setting this filter. Whatever residual noise is left gets further rejected at the regulator output by the supply rejection of the regulator servo loop, as it only appears at the drain of the NMOS pass device. Contrasting this to those disclosed in the '670 and '916 applications, the switching noise in these prior art schemes appear directly at the gate of the pass transistor and couple to the regulator output stronger. It is not possible to place a similar filter on the pass gate for the prior art topologies, as it comes within the main regulator servo loop and creates an additional pole into the loop and could easily cause instability. However, in the proposed topology according to embodiments of the invention, the filter is outside the main regulation servo loop and hence, poses no threat to stability.

Sixth, the start-up of the regulator is guaranteed by the adaptive self-starting scheme comprising the comparator CMP3 (327) and the start-up charge block (312). One possible implementation of the start-up charge block (500) is shown in FIG. 5.

Figure 5:
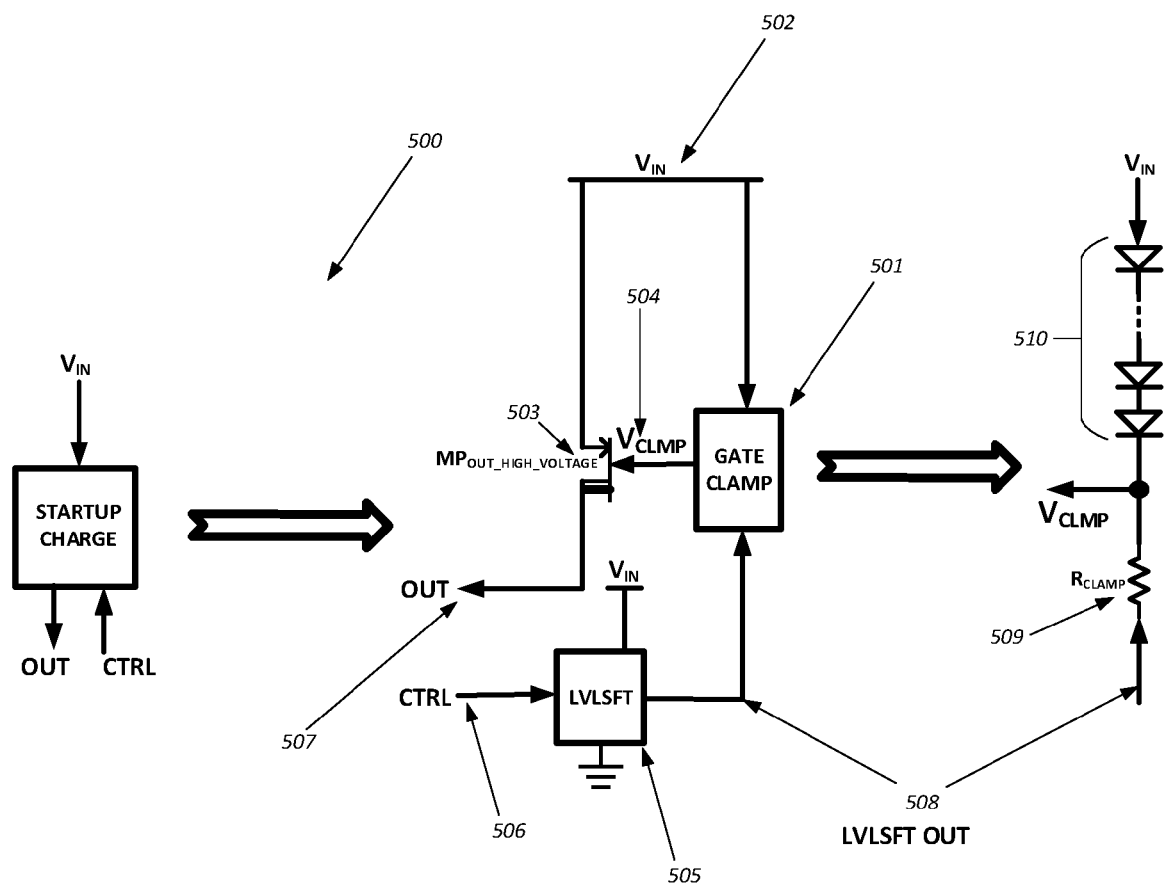
FIG. 5 shows an implementation of the start-up charging scheme of FIG. 3, in accordance with one embodiment of the invention.

Referring to FIG. 5, when the regulator is first turned ON, the output of CMP3 (CTRL in FIG. 5) drives the node $V_{CLMP}$ (504) low through the level shifter (505) and gate clamp block (501). The level shifter is needed to translate the CTRL signal getting generated in one voltage domain to the $V_{IN}$ level, where the gate clamp (501) operates. The high voltage PMOS charging device $MP_{OUT\_HIGH\_VOLTGAGE}$ (503) then charges the output load capacitor $C_L$ (306) and the output voltage $V_{OUT}$ (308) starts rising. Once this voltage reaches the set-point of the regulator, as determined by $V_{OUT}=V_{REF}*(1+R_2/R_1)$, the CMP3 output (CTRL) goes high, which then turns OFF the device (503), through the level shifter and gate clamp block and effectively signals the end of the start-up phase. It is to be noted that the point where the start-up phase stops is exactly the same as what the closed loop is trying to regulate the output to, so when the loop takes over and achieves regulation, the transition is preferably smooth or preferably as smooth as it can be.

A possible implementation of the gate clamp block (as reported in prior literature) is given by the combination of the current limiting resistor $R_{CLAMP}$ (509) and the series of diodes (510), which set the amount of maximum $V_{GS}$ to protect the gate oxide of the charging device (503), which is usually a high voltage rated device. It is clear that the gate clamp block takes reasonable amount of current to operate correctly, but this is only during the initial start-up phase when the output rises from 0V to the set point. After the main regulation loop takes over, this clamp circuit is automatically turned OFF, as explained earlier. Therefore, its quiescent current is zero during regulator operation.

Figure 8:
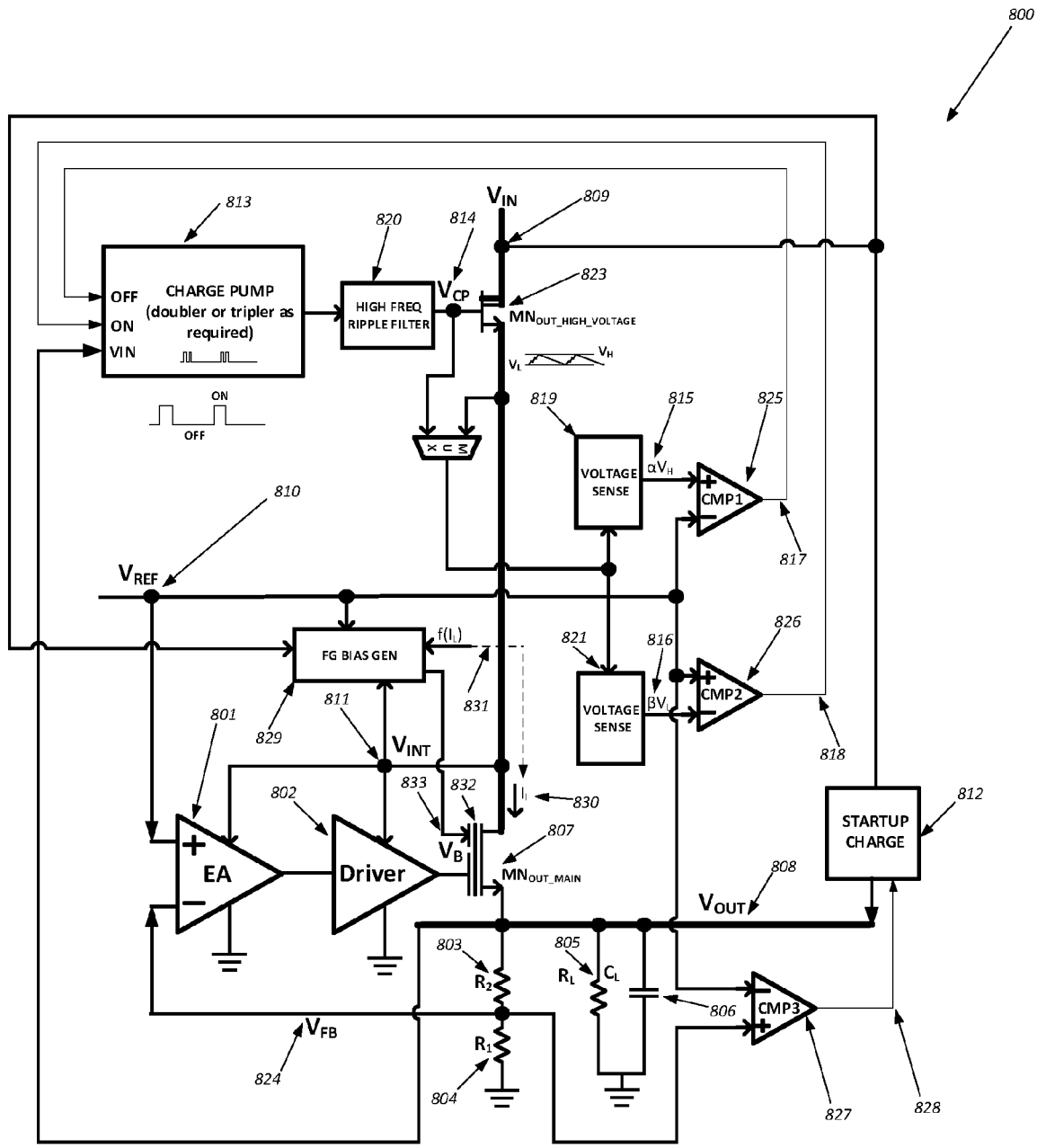
FIG. 8 shows an alternative proposal for a charge pump based cascoded LVR architecture using a multiple input floating gate transistor as the pass device, in accordance with one embodiment of the invention.

Now that we have explained in detail the basic functionality of the circuit, it is appropriate to discuss the next innovative feature in accordance with embodiments of the invention, with respect to the pass device $MN_{OUT\_MAIN}$ (307). For all the applications where it is required to have low drop-out, in addition to low quiescent current and a NMOS output device, it is proposed to make the main pass transistor a Multiple Input Floating Gate NMOS transistor. An example of this new topology (800) is shown in FIG. 8. The control bias voltage for the floating gate transistor is generated by the bias generator block (829). This block will be discussed in more details in the later paragraphs.

The floating gate transistor has an attractive property, as reported in prior literature, that its effective threshold voltage from the driver input can be modulated by using one of the gates as a control bias voltage. This threshold reduction, in turn, allows one to run the EA (801) and the driver circuits (802) at voltage levels on the $V_{INT}$ (811) slightly above (but close) to the $V_{OUT}$ itself, which results in low drop-out for the regulator. Sample calculations are given in the later paragraphs, which demonstrate how this is achieved for a design example.

Another interesting observation of the regulator loop is that even if there is trapped charge on the floating gate (832) due to manufacturing/handling, the regulator loop makes sure that this resulting error in the floating gate voltage is corrected by the high loop gain of the EA (801) and the driver circuits (802), as long as this trapped charge is not excessively high to saturate the gate voltage, which is usually the case with most process technologies. This attractive manufacturing aspect is a very nice feature to have, as it doesn't require any trimming or special manufacturing step such as Ultra-Violet (UV) exposure etc, which is required for other circuits such as memories and so on . . . .

In terms of process requirements, most analog processes have a second Poly layer (POLY-II) available, as this is used to build precision high density capacitors. The floating gate transistor can hence be easily built using the POLY-II for the two inputs and the regular polysilicon layer, being the actual floating gate (832), without requiring special extra masks.

The basic equation, ignoring parasitic capacitances, for the effective threshold voltage of a two input floating gate transistor is $$V_{TH,Eq} = \left(\frac{V_{TH} - k_1 V_B}{k_2}\right).$$

Here, $k_1$ is the capacitor coupling coefficient from the bias input to the floating gate and $k_2$ is the capacitor coupling coefficient from the regulator loop driver output to the floating gate. The bias voltage $V_B$ (833) can be chosen such that the effective threshold voltage is made either 0V or negative, depending on the drop-out voltage we want to achieve for the regulator.

For a typical process node, max $V_{TH}$=1V or so for a 5V device. Therefore, if we desire an effective $V_{TH}$ of −0.7V with a $k_1$=0.5($k_2 \cong 1-k_1$), we need a $V_B$ of 2.7V, which is easily achieved. The effective output stage transconductance is then set by sizing the floating poly plate size, based on design requirements. It is interesting to note that the higher the $V_B$, the lower the $k_1$, which means higher the $k_2$, and hence more output $g_m$ for a given size. This then becomes a design trade-off to balance drop-out/headroom, size and minimum input supply that needs to be supported. The above example calculations were shown just to prove that the resulting numbers are all easily achievable in a typical analog process node.

A more comprehensive way to generate the voltage $V_B$ is to use the generic equation $V_B = \alpha V_{REF} + \beta V_{INT} + \gamma V_{IN} + \delta f(I_L)$, where $\alpha$, $\beta$, $\gamma$ and $\delta$ are parameters which can be in the magnitude range $[-\infty, \infty]$ and $f(I_L)$ represents a generic function of output current $I_L$ (830) exhibited by the voltage output of the current sense block (not explicitly shown in the figure, but indicated by the dotted lines (831). An obvious (but not the only) way to implement the above co-efficient(s) $\beta$, $\gamma$, $\delta$ is to use more control inputs coupled with the appropriate scaling factors to the floating gate. The previous paragraph was a specific example of the above case where $\beta$, $\gamma$ and $\delta$ were all 0.

In more advanced implementations, these parameters can all be configured such that line regulation ($V_{IN}$ term of the equation) and load regulation ($I_L$ term of the equation) performance of the regulator can be improved further, by setting up appropriate secondary feedback loops, as indicated by the above equation. In the extreme case, these parameters can be frequency dependent as well, in addition to being just DC values, to improve AC performance parameters of the circuit. The possibilities are many, leading to several families of products. One of these topologies can be chosen, based on the particular set of product requirements.

The cascoded device (823) that is shown as a regular NMOS transistor in the figure can also be a multiple input floating gate device, to leverage the advantages highlighted in the previous paragraphs. Depending on the voltages required, the control bias for this device may or may not require a charge pump block, thus generating another family of structures.

Figure 9:
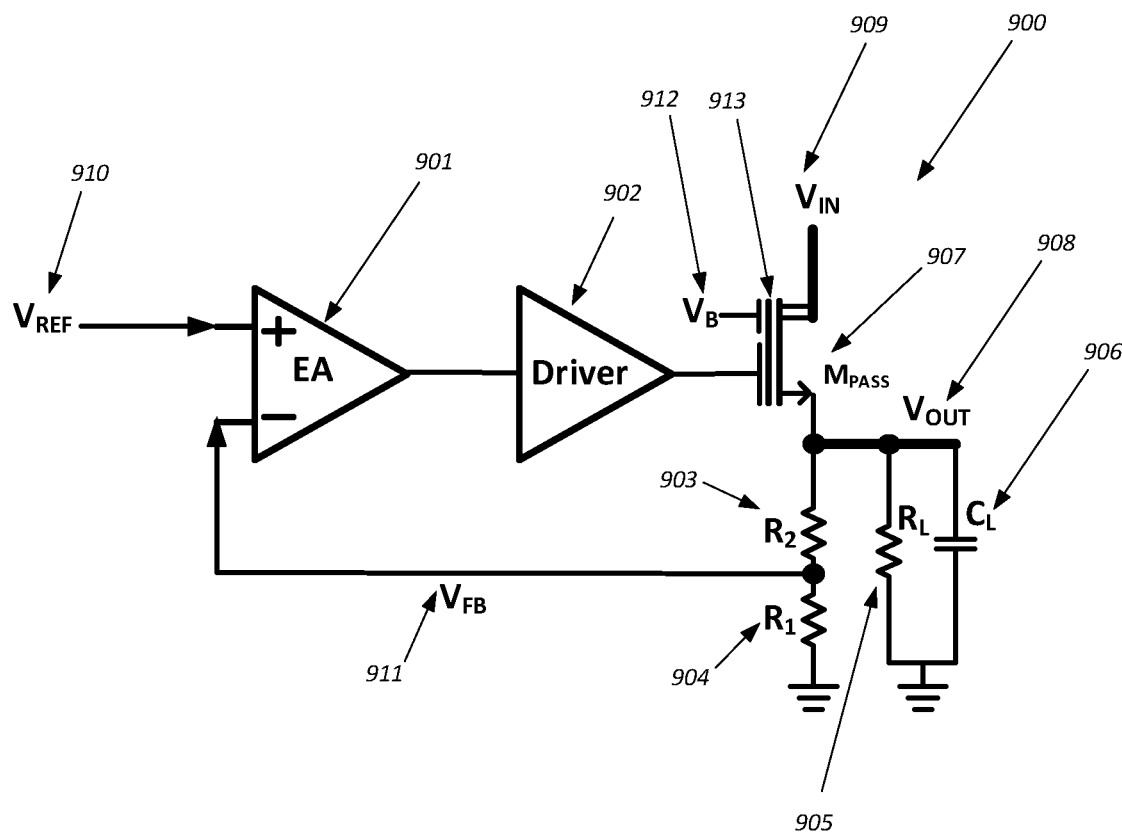
FIG. 9 shows an alternative proposal for a non-cascoded LVR architecture using a multiple input floating gate transistor as the pass device, in accordance with one embodiment of the invention.

As a limiting case of the previous paragraph, for those applications that can tolerate comparatively poorer line regulation, but still require low drop-out and the desirable properties of a NMOS output stage, a simpler non-cascoded variant (900) is proposed, as shown in FIG. 9, with the pass device (907) being a multiple input floating gate NMOS device. Depending on voltage ratings, the device (907) may or may not be a high voltage rated device. The control bias voltage $V_B$ (912) can be generated using the techniques explained previously, as required.

At this time, a word of clarification on the voltage rating of devices is appropriate. The structures presented so far are generic in terms of voltage rating. All of the explanations discussed thus far in this disclosure hold equally well for those applications where the maximum input supply voltage is in the low voltage domain (5V or less, as an example). Therefore, one skilled in the art would appreciate that embodiments of the invention are not limited by any particular voltage domain.

It has been clearly demonstrated in this disclosure that the proposed regulator architectures are innovative on several fronts and results in very competitive products by minimizing or eliminating some or all limitations of the prior art, while maintaining all its advantages.

It is possible to generate several different flavours of regulator structures by using different combinations of pass transistor and choices as explained, with or without cascoding, and by using different ways to generate the control bias for the floating gate transistor and so on. As such, these lead to extremely competitive and in fact, trend setting products which differentiate themselves clearly in a very crowded market space.

While embodiments of the invention have been illustrated with a limited number of examples, one skilled in the art would appreciate that other modifications and variations are possible without departing from the scope of the invention. Therefore, the scope of protection of the invention should only be limited by the attached claims.

What is claimed is:

1. A method for reducing power consumption of a charge pump driven Linear Voltage Regulator (LVR) with a cascoded n-type output pass device, comprising:
   a. sensing a charge pump output level;
   b. comparing the charge pump output level against a reference level;
   c. dynamically controlling a charge pump block to be ON only when required and OFF otherwise;
   d. ensuring that the charge pump drives only gate of the cascode transistor and no DC/static current load, so that a voltage is preserved for a duration; and
   e. filtering a charge pump output to reduce an impact of a switching noise of the charge pump on a regulator output, without causing stability impact, by performing the filtering outside a main servo loop of the LVR;
       wherein an n-type pass element and/or cascode element in the cascoded n-type output pass device comprises at least one selected from the group consisting of a Metal Oxide Semiconductor (MOS) Field Effect Transistor (FET), a bipolar junction transistor, a laterally diffused metal oxide semiconductor (LD-MOS), and a FinFET device.

2. The method of claim 1, wherein the cascoded n-type output pass device comprises a multiple input floating gate NMOS device.

3. The method of claim 1, wherein an internal supply $V_{INT}$ to an error amp and gate drive circuits are generated from a same node that supplies a load current, thereby eliminating a need for a dedicated circuitry for this purpose.

4. The method of claim 3, wherein the internal supply $V_{INT}$ is de-coupled from a main high voltage input supply, thereby allowing area savings by using Low Voltage (LV) components.

5. The method of claim 3, wherein the internal supply $V_{INT}$ is a function of a reference voltage and independent of an input supply, thereby improving supply rejection.

6. The method of claim 1, wherein, an input to the charge pump is fed-back from on output of the regulator, using a start up scheme, thereby eliminating extra circuitry; and wherein, switch over from a start-up phase to a loop regulation phase is designed to happen at a set point voltage, thereby minimizing glitches on an output node.

7. A charge pump driven Linear Voltage Regulator (LVR) system with a cascoded n-type output pass device, comprising:
an error amplifier;
a voltage feedback network;
a dynamically controlled charge pump block that is ON only when required and OFF otherwise;
a gate drive system configured to ensure that the charge pump drives only gate of a cascode transistor and no DC or static current load such that a voltage is preserved for a duration; and
a filter at the charge pump output to reduce an impact of the switching noise of the charge pump on the regulator output, wherein the filter is outside a main servo loop of the regulator,
wherein an n-type pass element and/or cascode element in the cascoded n-type output pass device comprises at least one selected from the group consisting of a Metal Oxide Semiconductor (MOS) Field Effect Transistor (FET), a bipolar junction transistor, an LDMOS, and a FinFET device.

8. The system of claim 7, wherein a cascode element in the cascoded n-type output pass device is a multiple input floating gate NMOS device.

9. The system of claim 7, wherein an internal supply $V_{INT}$ to the error amp and gate drive circuits are generated from a same node that supplies the load current, thereby eliminating a need for a dedicated circuitry for this purpose.

10. The system of claim 7, wherein an internal supply $V_{INT}$ to the error amp is de-coupled from a main high voltage input supply, thereby allowing area savings by using Low Voltage (LV) components.

11. The system of claim 7, wherein an internal supply $V_{INT}$ to the error amp is a function of a reference voltage and independent of the input supply, to improve supply rejection.

12. The system of claim 7, wherein an input to the charge pump is fed-back from an output of the regulator itself, thereby eliminating a need for an extra circuitry, and wherein switch over from a start-up phase to a loop regulation phase is configured to happen at same set point voltage, to minimize glitches on an output node.

13. A Linear Voltage Regulator system with low drop-out voltage using an n-type pass device, without a cascode, comprising:
an error amplifier;
a voltage feedback network;
a multiple input floating gate MOS device as the pass device;
a bias block to generate a control gate bias voltage of the multiple input floating gate MOS device such that an effective threshold voltage is lowered to a selected level to realize low drop-out; and
an adaptive block to make the control gate bias voltage a function of an input supply and a load current.

* * * * *